United States Patent
Chatterjee et al.

(10) Patent No.: US 9,304,951 B1
(45) Date of Patent: Apr. 5, 2016

(54) POLICY BASED INPUT/OUTPUT DISPATCHER

(75) Inventors: Paresh Chatterjee, Fremont, CA (US);
Srikumar Subramanian, Newark, CA (US); Sankarji Gopalakrishnan, Fremont, CA (US); Loganathan Ranganathan, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/449,491

(22) Filed: Apr. 18, 2012
(Under 37 CFR 1.47)

Related U.S. Application Data (60) Provisional application No. 61/476,723, filed on Apr. 18, 2011.

(51) Int. Cl.
*G06F 13/16* (2006.01)
(52) U.S. Cl.
CPC .................................. *G06F 13/161* (2013.01)

(58) Field of Classification Search
None
See application file for complete search history.

(56) References Cited

U.S. PATENT DOCUMENTS

| | | | |
|---|---|---|---|
| 7,551,623 B1* | 6/2009 | Feroz et al. | 370/395.21 |
| 2004/0049564 A1* | 3/2004 | Ng et al. | 709/223 |
| 2005/0005034 A1* | 1/2005 | Johnson | 710/6 |
| 2008/0222311 A1* | 9/2008 | Lee et al. | 710/6 |
| 2010/0115167 A1* | 5/2010 | Tardieux et al. | 710/240 |
| 2012/0198266 A1* | 8/2012 | Hofmann et al. | 713/501 |

\* cited by examiner

*Primary Examiner* — Ilwoo Park
(74) *Attorney, Agent, or Firm* — Meunier Carlin & Curfman LLC (57) ABSTRACT

Disclosed is a policy-based I/O dispatcher that intercepts I/O requests from several individual volumes made to a shared storage system (such as a RAID array) and manages these I/O requests so that no single volume monopolizes the I/O bandwidth and excludes the other volumes from timely completing their own I/O requests. Also disclosed are a plurality of attributes that may be assigned to each volume sharing a disk array to effectively manage the sharing of the disk array among the volumes. The I/O policy manager may handle I/O requests from several sources including volume-based iSCSI I/O requests as well as the file-share-based XFS I/O requests.

4 Claims, 6 Drawing Sheets

PRIOR ART

| Volume Attributes | Volume 1 | Volume 2 | Volume 3 |
|---|---|---|---|
| Max Read Bytes | 20 MB/s | 50 MB/s | 10 MB/s |
| Max Write Bytes | 30 MB/s | 50 MB/s | 10 MB/s |
| Max Read IOPS: | 400 IOPS | 400 IOPS | 100 IOPS |
| Max Write IOPS: | 200 IOPS | 400 IOPS | 100 IOPS |
| Target Avg. Read Latency: | 20 ms | 10ms | 40ms |
| Target Avg. Write Latency: | no target | no target | 40ms |

POLICY BASED INPUT/OUTPUT DISPATCHER

CROSS-REFERENCE TO RELATED APPLICATION

This application claims the benefit of U.S. provisional patent application No. 61/476,723, filed on Apr. 18, 2011, and entitled "Policy-Based Input/Output Dispatcher" which is expressly incorporated herein by reference in its entirety.

BACKGROUND

When multiple logical volumes share a common storage system such as a RAID array, the input/output (I/O) requests from one volume can negatively impact processing of I/O requests from other volumes, resulting in lower throughput and higher latency for client users.

SUMMARY

Several implementations disclosed herein are directed to a policy-based I/O dispatcher (PBID or simply "Dispatcher") that intercepts I/O requests from several individual volumes made to a shared storage system (such as a RAID array) and manages these I/O requests so that no single volume monopolizes the I/O bandwidth and excludes the other volumes from timely completing their own I/O requests. Various implementations further balance I/O requests in an effort to improve overall quality of service ("QoS") for the entire system, and several implementations may balance I/O requests in an effort to provide a minimal QoS for each volume. Certain implementations also provide for higher priority processing of I/O requests from certain high-priority volumes and lower priority processing of I/O requests from other low-priority volumes. Some implementations further attempt to balance throughput and latency for each volume.

Various implementations disclosed herein are also directed to a plurality of attributes that may be assigned to each volume sharing a disk array to effectively manage the sharing of the disk array among the volumes. Several such implementations may also be directed to an I/O policy manager for handling I/O requests from several sources including volume-based iSCSI I/O requests as well as the file-share-based XFS I/O requests.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

A disk array is a disk storage system which contains multiple disk drives. A Redundant Array of Independent/Inexpensive Disks (or RAID) is the combination of multiple disk drive components into a single logical unit where data is distributed across the drives in one of several approaches (referred to as "RAID levels"). "RAID" has also become an umbrella term for computer data storage schemes that can divide and replicate data among multiple physical disk drives arranged in a "RAID array" addressed by the operating system as a single virtual disk comprising one or more volumes.

Many operating systems implement RAID in software as a layer that abstracts multiple physical storage devices to provide a single virtual device as a component of a file system or as a more generic logical volume manager (typical for server systems). Server system implementations typically provide volume management which allows a system to present logical volumes for use. As such, a volume is a single accessible storage area within a single file system that represents a single logical disk drive, and thus a volume is the logical interface used by an operating system to access data stored in a file system that can be distributed over multiple physical devices.

In storage systems such as RAID, a disk array controller (DAC) is used to manage the physical disk drives and present them as logical units or volumes to the computing system. When the physical disk drives comprise a RAID, the disk array controller can also be referred to as a RAID controller. The DAC provides both a back-end interface and a front-end interface. The back-end interface communicates with the controlled disks using a protocol such as, for example, ATA, SATA, SCSI, FC, or SAS. The front-end interface communicates with a computer system using one of the disk protocols such as, for example, ATA, SATA, SCSI, or FC (to transparently emulate a disk for the computer system) or specialized protocols such as FICON/ESCON, iSCSI, HyperSCSI, ATA over Ethernet, or InfiniBand. The DAC may use different protocols for back-end and front-end communication.

External disk arrays, such as a storage area network (SAN) or network-attached storage (NAS) servers, are physically independent enclosures of disk arrays. A storage area network (SAN) is a dedicated storage network that provides access to consolidated block-level storage, and is primarily are used to make storage devices (such as disk arrays) accessible to servers so that the devices appear as locally attached to those servers. A SAN typically comprises its own intra-network of storage devices that are generally not directly accessible by regular devices. A SAN alone does not provide the "file" abstraction, only block-level operations on virtual blocks of data; however, file systems built on top of SANs do provide this abstraction and are known as SAN file systems or shared disk file systems. Virtual blocks, or "block virtualization," are the abstraction (of separation) of logical storage from physical storage so that data may be accessed without regard to physical storage or heterogeneous structure and thereby allows the storage system greater flexibility in how its manage it physical storage.

Network-attached storage (NAS), on the other hand, is file-level computer data storage connected to a computer network providing data access to heterogeneous clients. NAS systems typically comprise one or more hard drives often arranged into logical redundant storage containers or RAID arrays. Network-attached storage (NAS), in contrast to SAN, does not attempt to appear as locally attached but, instead, uses several file-based sharing protocols such as NFS, SMB/CIFS, of AFP to enable remote computers to request a portion of an abstract file (rather than a disk block). As such, an NAS may comprise a SAN and/or a disk array, and an "NAS gateway" can be added to a SAN to effectively convert it into a NAS since NAS provides both storage and a file system whereas SAN provides only block-based storage and leaves file system concerns to the client. NAS can also be used to refer to the enclosure containing one or more disk drives (which may be configured as a RAID array) along with the equipment necessary to make the storage available over a computer network (including a dedicated computer designed to operate over the network).

Of course, there are also several non-RAID storage architectures available today, including, for example, the Single Large Expensive Drive (SLED) which, as the name implies, comprises single drive, as well as disk arrays without any additional control—and thus accessed simply as independent drives—which are often referred to as the "Just a Bunch Of Disks" (JBOD) architecture. For the various implementations disclosed herein, the use of RAID or a RAID array can be easily substituted with one of the several non-RAID storage architectures, and thus references to RAID or a RAID array are merely exemplary and are in no way intended to be limiting.

Figure 1:
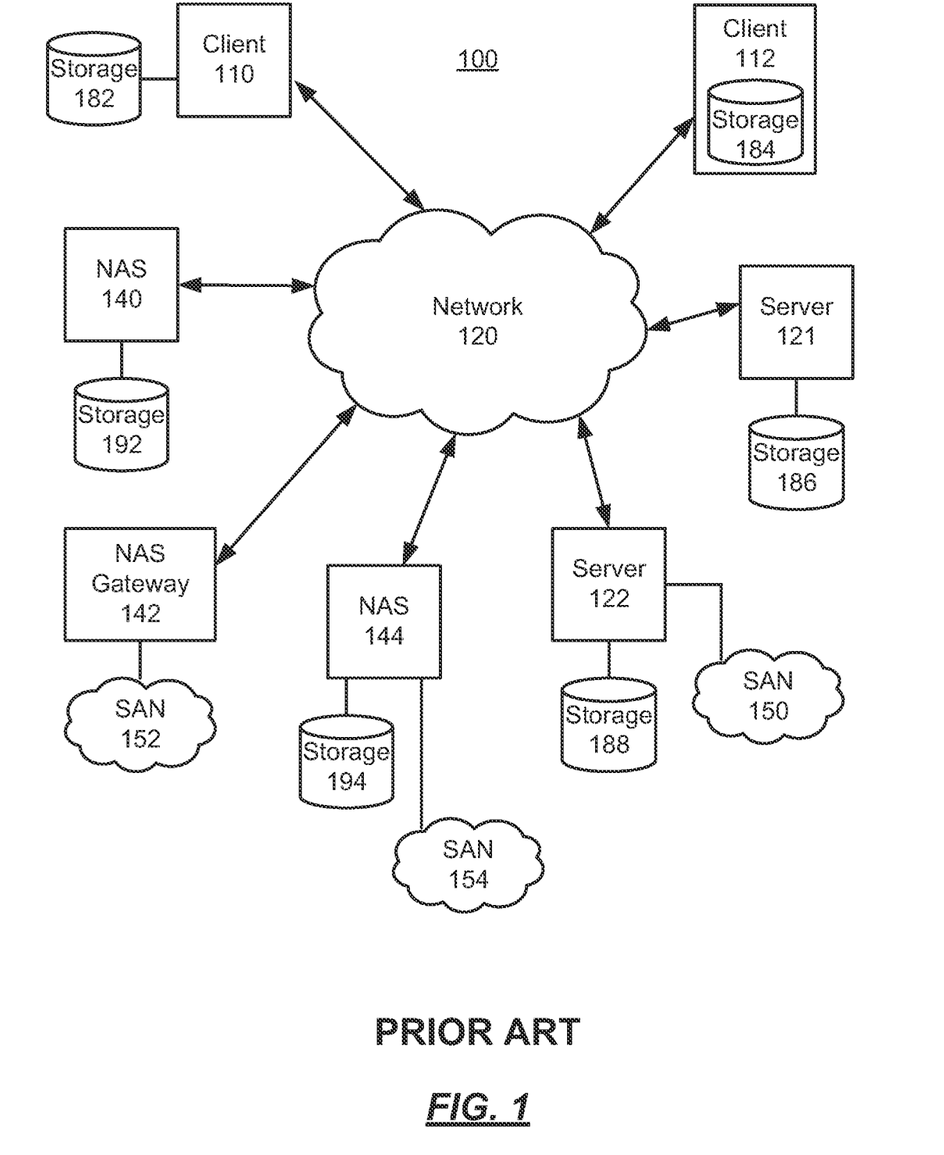
FIG. 1 is an illustration of an exemplary network environment in which the numerous implementations disclosed herein may be utilized.

FIG. 1 is an illustration of an exemplary networked computer environment 100 in which the numerous implementations disclosed herein may be utilized. The network environment 100 may include one or more clients 110 and 112 configured to communicate with each other or with one or more servers 121 and 122 through a network 120 which may be a variety of network types including the public switched telephone network (PSTN), a cellular telephone network, and a packet switched network (e.g., the Internet). A client, such as client 110, may comprise an external or removable storage device 182, or a client, such as client 112, may comprise an internal or non-removable storage device 184. A server, such as server 121, may also comprise a storage device 186 or a collection of storage devices. The network environment 100 may further comprise one or more NAS servers 140 and 142 configured to communicate with each other or with one or more clients 110 and 112 and/or one or more servers 121 and 122 through the network 120. An NAS server 140 and 142 may also comprise a storage device 192 and 194. The storage devices 182, 184, 186, 188, 192, and 194 may be a disk array (such as a RAID array), a SLED, a JBOD system, or any other storage system. In addition, the network environment 100 may also comprise one or more SANs 150, 152, and 154 that are operatively coupled to, for example, a server (such as SAN 186 coupled to server 121), an NAS server (such as the SAN 154 coupled to NAS server 144), or to a an NAS gateway 142 that together with its SAN 152 together provide the functionality of an NAS server. A server or an NAS server, such as NAS server 144, may comprise both a storage device 194 and a SAN 154.

While the clients 110 and 112, servers 121 and 122, NAS servers 140 and 144, and NAS gateway 142 are illustrated as being connected by the network 120, in some implementations it is contemplated that these systems may be directly connected to each other or even executed by the same computing system. Similarly, while the storage devices 182, 184, 186, 188, 192, and 194 are shown as connected to one of a client or a server, in some implementations it is contemplated that the storage devices 182, 184, 186, 188, 192, and 194 may be connected to each other or to more than one client and/or server, and that such connections may be made over the network 120 as well as directly. This is also true for the SANs 150, 152, and 154, although each SANs' own intra-network of storage devices are generally not directly accessible by regular devices.

In some implementations, the clients 110 and 112 may include a desktop personal computer, workstation, laptop, PDA, cell phone, smart phone, or any WAP-enabled device or any other computing device capable of interfacing directly or indirectly with the network 120. The clients 110 and 112 may run an HTTP client (e.g., a web-browsing program) or a WAP-enabled browser in the case of a cell phone, PDA or other wireless device, or the like, allowing a user of the clients 110 and 112 to access information available to it at the servers 121 and 122 or to provide information to the servers 121 and 122. Other applications may also be used by the clients 110 and 112 to access or provide information to the servers 121 and 122, for example. In some implementations, the servers 121 and 122 may be implemented using one or more general purpose computing systems.

Figure 2A:
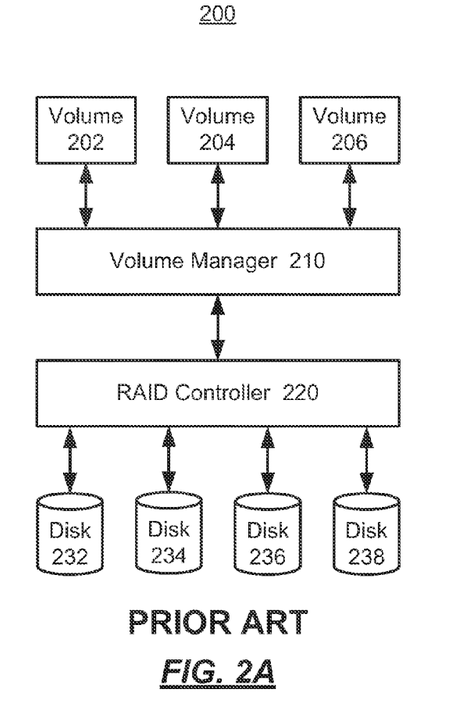
FIG. 2A is a block diagram illustrating a typical storage device exposing a plurality of volumes (or logical disks) managed by a volume manager (VM) and backed by a disk array comprising a RAID controller its associated plurality of physical disks.
Figure 2B:
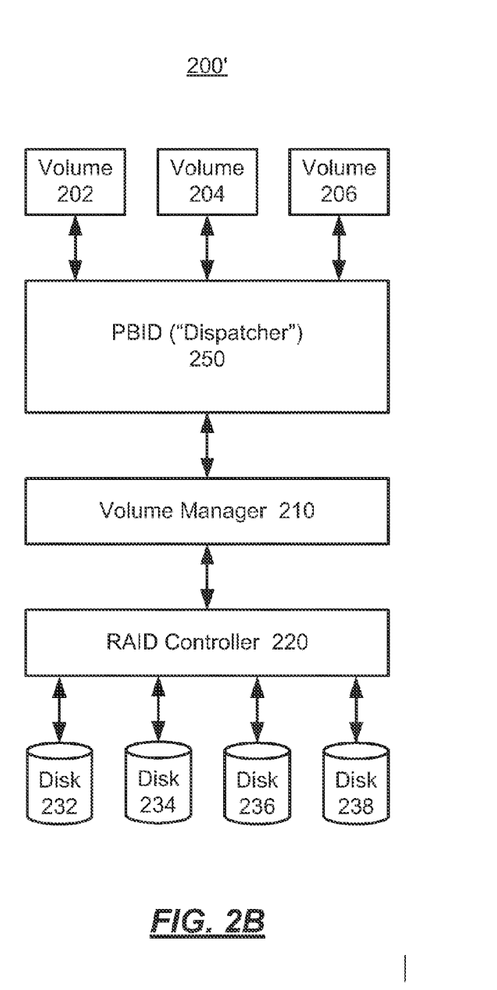
FIG. 2B is a block diagram illustrating the storage device of FIG. 2B further comprising a Policy-Based I/O Dispatcher according to various implementations disclosed herein.

FIG. 2A is a block diagram illustrating a typical storage system 200 exposing a plurality of volumes (or logical disks) 202, 204, and 206 managed by a volume manager (VM) 210 and backed by a disk array comprising, for example, a RAID controller 220 and its associated plurality of physical disks 232, 234, 236, and 238. FIG. 2B is a block diagram illustrating the storage device 200' of FIG. 2B but further including a Policy-Based I/O Dispatcher (PBID or simply "Dispatcher") 250. The Dispatcher 250 manages I/O requests such that, for each volume in a storage system 200', no single volume is able to monopolize the available I/O bandwidth provided by the VM 210 to its backing physical storage—and thus provides more efficient and effective sharing of the available I/O bandwidth among the different volumes.

In the storage system 200', the Dispatcher 250 resides in the stack between the individual volumes 202, 204, and 206 and the VM 210 in order to intercept I/O requests sent from the volumes 202, 204, and 206 to the VM 210 for processing on the RAID array (the RAID controller 220 and its physical disks 232, 234, 236, and 238). Thus whereas volumes directly communicate I/O requests to the Volume Manager in uncontrolled storage system of FIG. 2A, the controlled storage system of FIG. 2B uses the Dispatcher to regulate I/O requests between each individual volume and the VM in accordance with the I/O attributes assigned to each such volume. Thus in some instance the VM may immediately forward an I/O request from a volume that has not exceeded the limits defined by its attributes, while in other instances the VM may locally cache and/or queue I/O requests received from a volume that has exceeded its limits (or, in some implementations, will exceed its limits).

In general, I/O bandwidth is defined in terms of throughput and/or latency. Throughput can be measured either in terms of the data rate (megatbytes per second, or MB/s) or based on the number of I/O operations per second (IOPS) without regard to the size of the data behind each I/O operation. Latency, on the other hand, is defined in terms of the time that elapses between a request and fulfillment of that request and is generally given as a trailing average measured in milliseconds (ms) but readily convertible to seconds (s). Significantly, latency is inversely related to throughput as represented by the following formula (with latency here measured in seconds):

$$Average\_Latency = Q\_depth / IOPS$$

Storage systems, and in particular the disk array subsystems, deliver optimum performance when the right amount (not too much and not to little) of outstanding I/O to be processed (or "Q-depth") is maintained. On the one hand, if there is too little I/O—resulting in periods of "idle time" where no I/O processing is occurring on the disk array subsystem—then throughput (measured as MB/s or IOPS) naturally suffers because it is processing less data (MB or IO) per unit of time (seconds), whereas latency (the amount of time from request to fulfillment from the client perspective) should be at a most-optimal minimum. Conversely, if there is too much I/O—resulting in a long queue of I/O requests waiting to be processed—then throughput is maximized (i.e., no "idle time") but latency may be maximized as well. Thus, the desired equilibrium is achieved when "idle time" is minimized and the queue of I/O requests is kept short.

Since multiple volumes may share the same underlying RAID Logical Disk in a storage system, I/O requests from one volume may negatively impact the performance of the other volumes in the storage system. However, using an effective I/O Policy, the Dispatcher 250 can minimize this impact by directly controlling resource hungry volumes in accordance with the I/O Policy parameters (or attributes) set for each such volume. In other words, the Dispatcher 250 can be used to constrain resource hungry volumes so that other volume can be assured of having their own share of I/O resources (in terms of the I/O bandwidth).

For each volume, an I/O policy is defined by one or more attributes. For example, a first volume might have Max Write Bytes and Max Write IOPS set to specific levels, and the Dispatcher will prevent this volume from exceeding those levels. Similarly, a second volume may have its Target Average Write Latency set to a specific level, and the Dispatcher attempts to maintain this volume's I/O requests at the specified level of latency by either (a) delaying I/O requests to increase average latency to more closely match (but not exceed) the target level or (b) more quickly processing I/O requests to decrease average latency until just below the target level. Combining these concepts, a third volume may have both Max Write IOPS and Target Average Write Latency set to specific levels, in which case the Dispatcher simultaneously limits the IOPS for that volume do not exceed the set maximum and attempts to maintain the average write latency at the target level. Because IOPS and latency are inversely related, it may give priority to one over the other, for example, if the latency exceeds the Target Average Write Latency then the Dispatcher may permit IOPS for that volume to temporarily exceed the Max Write IOPS limit (either by temporarily raising the limit or temporarily ignoring the limit) until the average write latency for that volume no longer exceeds the Target Average Write Latency set for that volume.

An I/O Policy (IP) for each individual volume may comprise, for example, one or more of the following attributes:
Max Read Bytes (MB/s): to limit read I/O throughout;
Max Write Bytes (MB/s): to limit write I/O throughput;
Max Read IOPS: to limit read I/O requests (and control random reads);
Max Write IOPS: to limit write I/O requests (and control random writes);
Target Average Read Latency (ms): to manage read latency;
Target Average Write Latency (ms): to manage write latency; and
No Restrictions: I/O requests are processed immediately (no management).

Figure 3A:
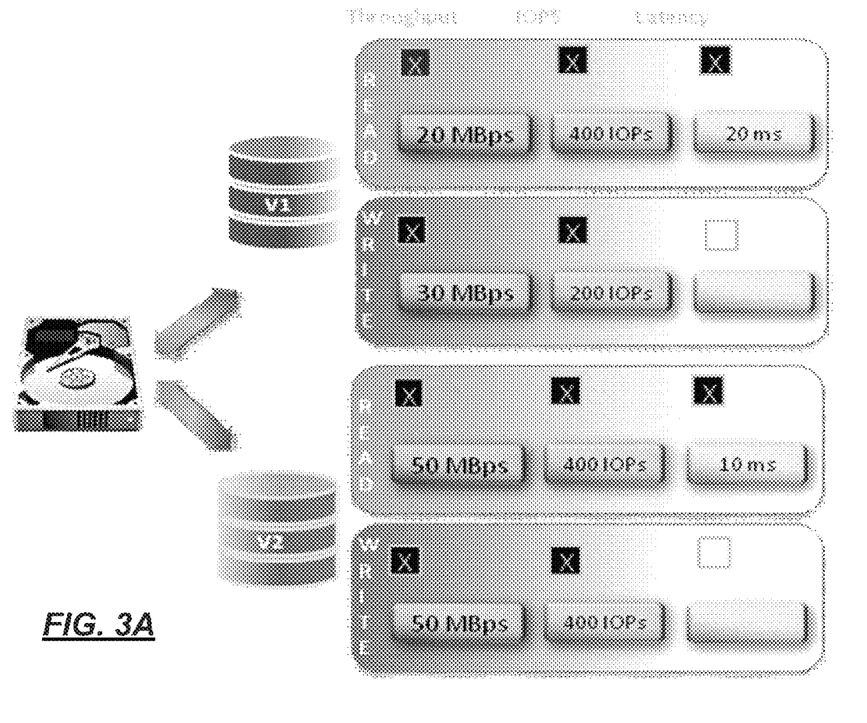
FIG. 3A is block diagram illustrating possible attributes for two volumes grouped into a read set and a write set.
Figure 3B:
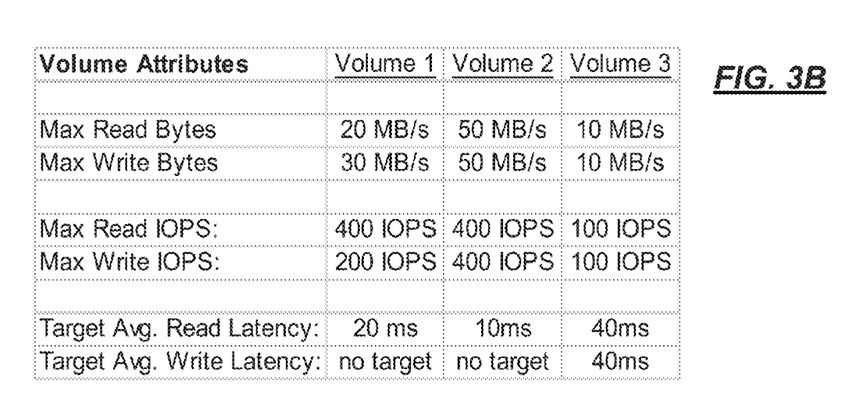
FIG. 3B is a table illustrating exemplar threshold values for the attributes for three volumes including the two volumes of FIG. 3A.

FIG. 3A is block diagram illustrating the attributes for two volumes grouped into a read set and a write set. FIG. 3B is a table illustrating the threshold values for the attributes for three volumes (including the two volumes of FIG. 3A). In this example, it should be noted that read and write I/O requests are treated separately and may have substantially different thresholds, although alternative implementations may bundle together read and write I/O requests into a single threshold (e.g., "Max I/O Bytes" and "Max I/O IOPS", for example). Moreover, each attribute in the system might be handled individually such that, for certain implementations, only those I/O requests pertaining to a specific threshold may be impacted. For example, if the Max Read Bytes threshold has been exceeded for a certain volume, then additional read I/O requests will be cached and queued until the read throughput for that volume returns to below the threshold, whereas write I/O requests may be processed without delay so long as the Max Write Bytes threshold has not been exceeded. In other implementations, however, any threshold that is exceeded may impact all other I/O requests (i.e., cached and queued) until all throughput measures fall below the threshold limits.

Of course, several other variations on implementation are also possible and anticipated by this disclosure, including the use of a default set of attributes for a newly created volume (e.g., "No Restrictions"), as well as additional attributes such as "Priority" for high- and low-priority volumes (discussed below). Likewise, certain implementations may cache and queue an I/O request after a threshold has been exceeded, while other implementations may cache and queue an I/O request that, if otherwise processed, would cause a threshold to be exceeded.

For certain implementations, a volume may be deemed to be a high priority volumes (HPVs) and have its I/O requests immediately forwarded by the Dispatcher to the DVM to be processed as quickly as capacity permits. Conversely, other volumes might be deemed to be low priority volumes (LPVs) and have their I/O requests substantially delayed (i.e., without regard to latency) until such times as the demand on the DVM is relatively minimal (so as to not interfere with the timely processing of I/O requests of other volumes). In some implementations, HPVs and LPVs may be designated (like an attribute), while in other implementations they may be automatically assigned and dynamically changed in accordance with established criteria.

For certain implementations, volumes having mostly sequential I/O requests might be deemed to be high efficiency volumes (HEVs) and automatically given higher throughput thresholds while continuing to have mostly sequential I/O requests. On the other hand, volumes having mostly random I/O requests may be deemed to be low efficiency volumes (LEVs) and automatically given lower throughput thresholds so as not to interfere with high efficiency volumes so long as such volumes mostly make random I/O requests. The thresholds for a volume to be HEV or LEV may be common to all volumes in the storage system, or individual threshold levels may be set for each volume.

Figure 4A:
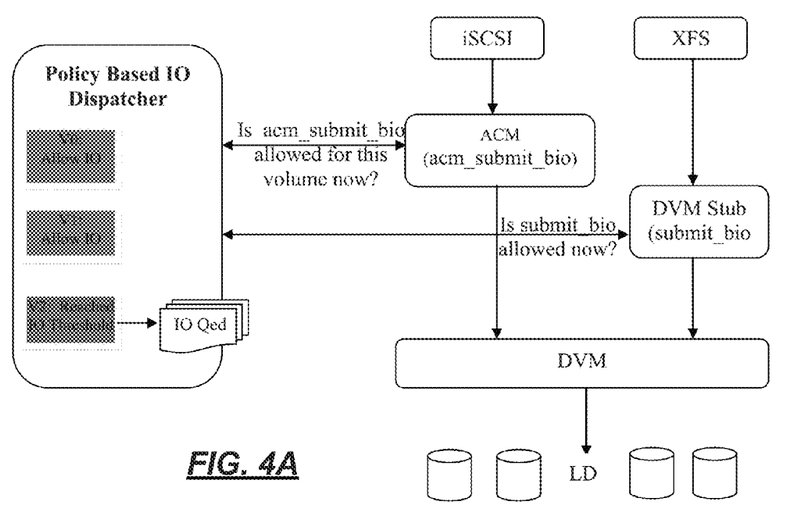
FIG. 4A is a block diagram illustrating an exemplary implementation showing the intercession of the Dispatcher between I/O Request clients (or "initiators") and the storage system.
Figure 4B:
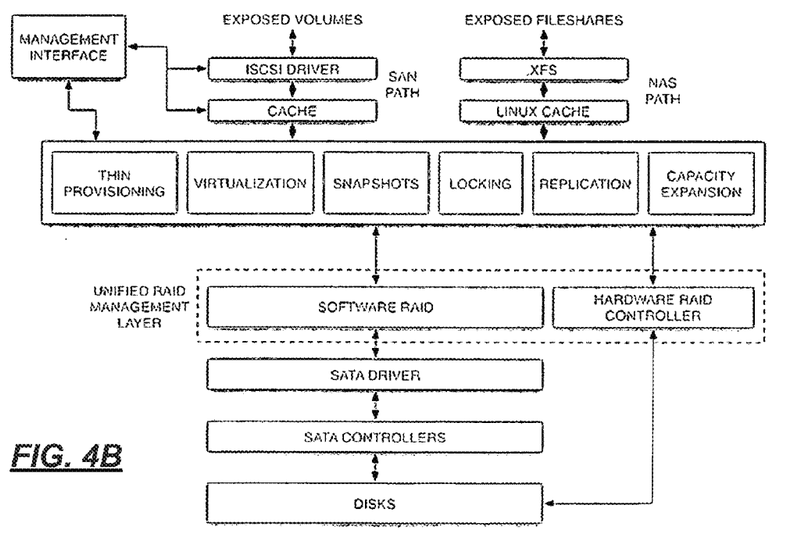
FIG. 4B is a complimentary block diagram to FIG. 4A showing additional detail with regard to SAN paths and NAS paths, as well as several blocks of additional functionality that may exist in a RAID controller, and a view of the Dispatcher (here, part of the management interface or VM) coupled to the RAID controller as well as the iSCSI driver and cache (and possibly the XFS file system driver and cache)

FIG. 4A is a block diagram illustrating an exemplary implementation showing the intercession of the Dispatcher between I/O Request clients (or "initiators") and the storage system. As this figure demonstrates, a volume may comprise a data volume (in the case of iSCSI I/O requests) or a fileshare (in the case of the XFS I/O requests). FIG. 4B is a complimentary block diagram to FIG. 4A showing additional detail with regard to SAN paths and NAS paths, as well as several blocks of additional functionality that may exist in a RAID controller, and a view of the Dispatcher (here, part of the management interface or VM) coupled to the RAID controller as well as the iSCSI driver and cache (and possibly the XFS file system driver and cache). At the top of the stack, storage volumes or fileshares are exposed to the clients. At the bottom of the storage stack are the actual hard disk drives that are utilized to store the data. The hard disk drives are, in turn, connected to a disk controller, such as a Serial ATA (SATA) controller or a hardware RAID controller. In the case of a SATA controller, a SATA driver may be utilized to access the hardware device, and a software RAID module may be utilized to provide RAID services in the absence of a hardware RAID controller. A unified RAID management layer may be utilized to simplify the utilization of RAID with either software or hardware implementations.

Above the RAID management layer sits a device driver that implements additional functions as an extension to the management interface (comprising the VM and Dispatcher described herein). Above this device driver a number of software components are utilized depending upon the access mechanism utilized to access the data stored on the hard disk drives. In particular, a SAN path is provided that utilizes a cache and an iSCSI driver, and a NAS path is also provided that utilizes a cache and the XFS high-performance journaling files system, for example. As such, volumes are exposed through the SAN path while fileshares are exposed through the NAS path, although both constitute "volumes" with regard to disclosures herein pertaining to the various implementations.

Figure 5:
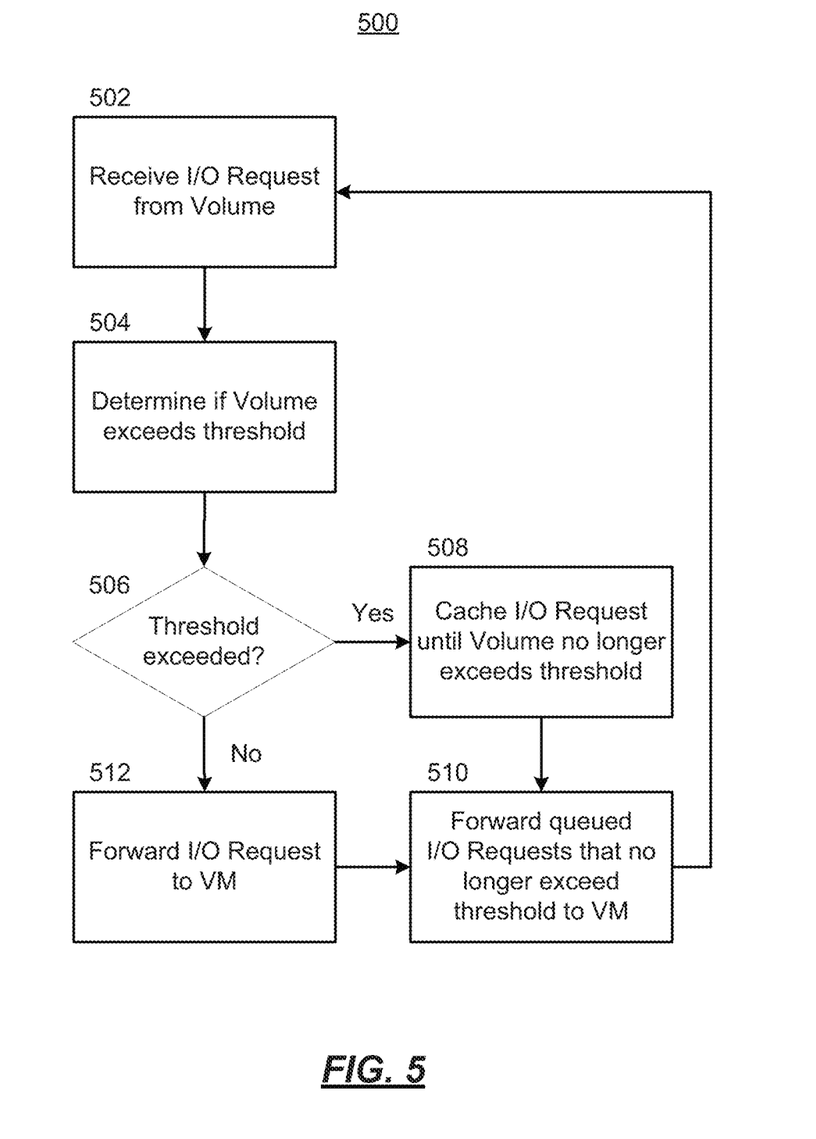
FIG. 5 is an operations flow diagram for several Dispatcher implementations disclosed herein in which example implementations and aspects may be implemented.

FIG. 5 is an operations flow diagram for several Dispatcher implementations disclosed herein. In FIG. 5, at 502, the Dispatcher receives an I/O request from a volume and originating from a client (or "initiator"). At 504, the Dispatcher determines if the volume corresponding to the I/O request has exceeded its threshold limits pertaining to the I/O request and branches at 506 accordingly. If so, at 508 the Dispatcher caches and queues the I/O request until the volume is not longer exceeding its threshold limits; if not, then at 512 the Dispatcher forwards the I/O request to the VM. The Dispatcher then, at 510, checks to see if any cached I/O requests are from volumes that are no longer exceeding their threshold limit and forwards those I/O requests to the VM for processing as well. The Dispatcher then returns to 502 to process the next received I/O request.

Figure 6:
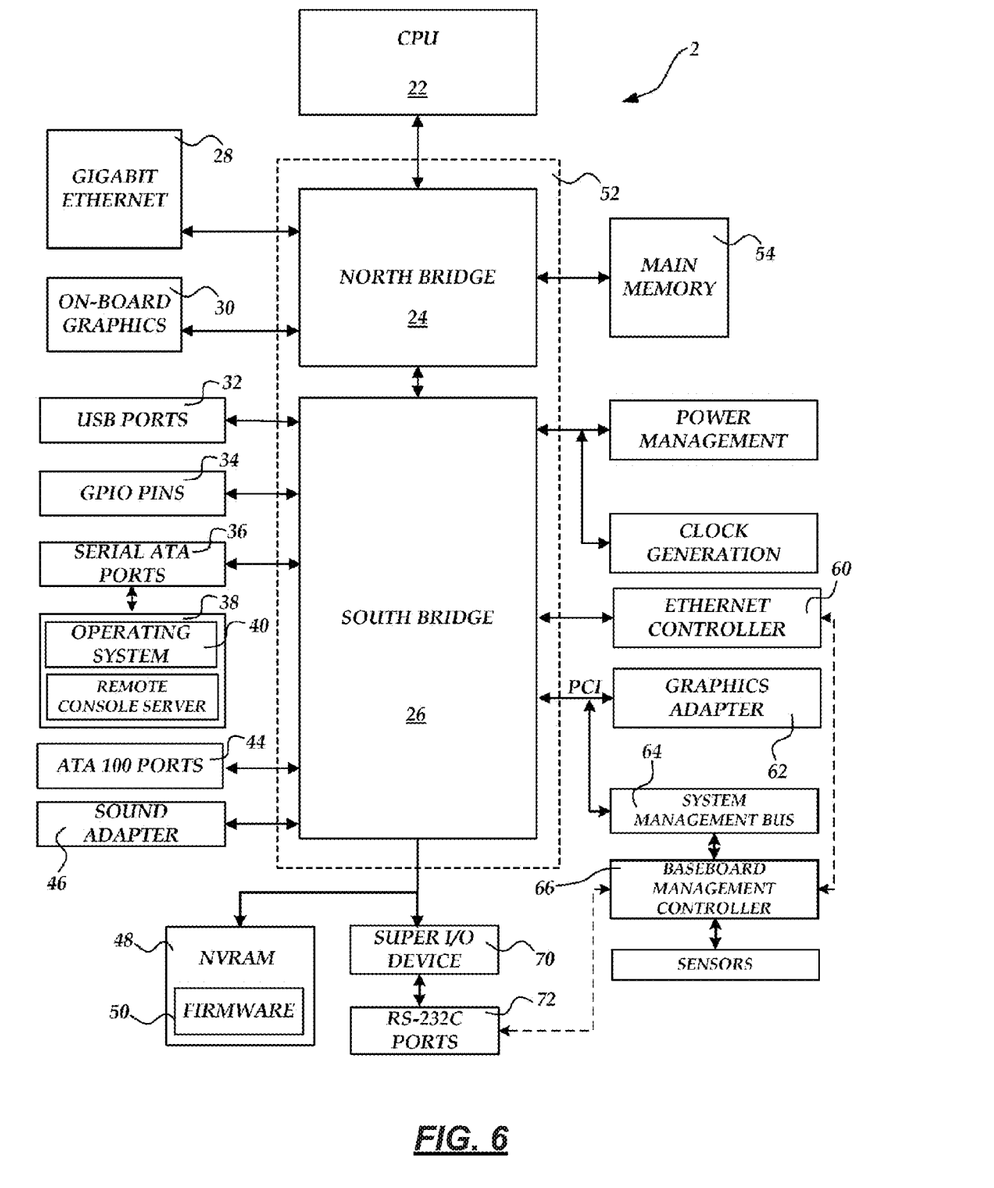
FIG. 6 shows an exemplary storage node computer environment (e.g., a computer server and/or NAS server) in which example implementations and aspects may be implemented.

FIG. 6 shows an exemplary storage node computer environment (e.g., a computer server and/or NAS server) in which example implementations and aspects may be implemented. Referring to FIG. 6, the storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 6, may include other components that are not explicitly shown in FIG. 6, or may utilize an architecture completely different than that shown in FIG. 6.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing I/O operations in a shared storage system, the method comprising:

by a logical volume manager module, managing plurality of individual volumes backed by a RAID array comprising a RAID controller and a plurality of physical disks, wherein the logical volume manager is configured to process I/O requests sent from the plurality of individual volumes;

by a Policy-Based I/O module which resides in the stack between the plurality of individual volumes and the logical volume manager, intercepting, requests sent from the plurality of individual volumes to the logical volume manager for processing on the RAID array; and by the Policy-Based I/O module, assigning a maximum throughput perform attribute and a target latency performance attribute to each volume of the plurality of individual volumes;

by the Policy-Based I/O module, regulating processing of the I/O requests between each of the plurality of individual volumes and the to logical volume manager in accordance with the I/O attributed assigned to each volume, wherein regulating processing of the I/O requests comprises:

the Policy-Based I/O dispatcher determining for each volume of the plurality of volumes whether a throughput of the volume exceeds the assigned maximum throughput performance attribute of the volume, and if the assigned throughput performance attribute of the volume is not exceeded, the Policy-Based I/O dispatcher then forwards intercepted I/O requests of the volume to the logical volume manager for processing on the RAID array; and if the assigned maximum throughput performance attribute of the volume is exceeded, the Policy-Based I/O dispatcher then determines whether a latency of the volume exceeds the assigned target latency performance attribute of the volume, if the assigned target latency of the volume is not exceeded, then, instead of forwarding intercepted I/O requests to the logical volume manager, the Policy-Based I/O dispatcher module caches intercepted I/O requests of the volume until the throughput of the volume longer exceeds the assigned maximum throughput performance attribute of the volume; and if the assigned target latency of the volume is exceeded and the assigned maximum throughput performance attribute of the volume is exceeded, then, instead of caching intercepted I/O requests, the Policy-Based I/O dispatcher forwards intercepted I/O requests of the volume to the volume manager for processing of the I/O on the RAID array while temporarily allowing the throughput of the volume to exceed the assigned maximum throughput performance attribute of the volume until the latency of the volume no longer exceeds the target latency performance attribute set for the volume.

2. The method of claim 1, wherein the assigned throughput performance attribute includes at least one from the group comprising a maximum read data rate, a maximum write data rate, a maximum number of read operations per second, and a maximum number of write operations per second, and wherein the assigned latency performance attributes includes at least one from the group comprising a target average read latency and a target average write latency.

3. A storage system computer for managing I/O operations in a shared storage system, comprising:
   a processor;
   a memory communicatively connected to the processor;
   a logical volume manager module that manages a plurality of individual volumes backed by a RAID array comprising a RAID controller and a plurality of physical disks, wherein the logical volume manager is configured to process I/O requests sent from the plurality of individual volumes; and
   a Policy-Based I/O dispatcher module which resides in the stack between the plurality of individual volumes and the logical volume manager to intercept I/O requests sent from the plurality of individual volumes to the logical volume manager for processing on the RAID array, wherein the Policy-Based I/O dispatcher module is configured to:
      assign, to each volume of the plurality of individual volumes, a maximum throughput perform attribute and a target latency performance attribute; and
      regulate processing of the I/O requests between each of the plurality of individual volumes and the logical volume manager in accordance with the I/O attributed assigned to each volume;
   wherein regulating processing of the I/O requests comprises:
      the Policy-Based I/O dispatcher determining for each volume of the plurality of volumes whether a throughput of the volume exceeds the assigned maximum throughput performance attribute of the volume, and if the assigned throughput performance attribute of the volume is not exceeded, the Policy-Based I/O dispatcher then forwards intercepted I/O requests of the volume to the logical volume manager for processing on the RAID array; and
      if the assigned maximum throughput performance attribute of the volume is exceeded, the Policy-Based I/O dispatcher then determines whether a latency of the volume exceeds the assigned target latency performance attribute of the volume, if the assigned target latency of the volume is not exceeded, then, instead of forwarding intercepted I/O requests to the logical volume manager, the Policy-Based I/O dispatcher module caches intercepted I/O requests of the volume until the throughput of the volume no toner exceeds the assigned maximum throughput performance attribute of the volume; and
      if the assigned target latency of the volume is exceeded and the assigned maximum throughput performance attribute of the volume is exceeded, then, instead of caching intercepted I/O requests, the Policy-Based I/O dispatcher forwards intercepted I/O requests of the volume to the volume manager module for processing of the I/O on the RAID array while temporarily allowing the throughput of the volume to exceed the assigned maximum throughput performance attribute set of the volume until the latency of the volume no longer exceeds the assigned target latency performance attribute of the volume.

4. The storage system computer of claim 3, wherein the assigned throuphput performance attribute includes at least one from the group comprising a maximum read data rate, a maximum write data rate, a maximum number of read operations per second, and a maximum number of write operations per second, and wherein the assigned latency performance attributes includes at least one from the group comprising a target average read latency and a target average write latency.

* * * * *